United States Patent
Meuter

(10) Patent No.: US 7,775,527 B2
(45) Date of Patent: Aug. 17, 2010

(54) SHAFT SEALING ARRANGEMENT FOR A PUMP FOR DELIVERING HOT FLUIDS

(75) Inventor: Paul Meuter, Seuzach (CH)

(73) Assignee: Sulzer Pumpen AG, Winterthur (CH)

( * ) Notice: Subject to any disclaimer, the term of this patent is extended or adjusted under 35 U.S.C. 154(b) by 852 days.

(21) Appl. No.: 11/103,949

(22) Filed: Apr. 11, 2005

(65) Prior Publication Data

US 2005/0179208 A1    Aug. 18, 2005

Related U.S. Application Data

(62) Division of application No. 10/272,424, filed on Oct. 15, 2002, now abandoned.

(30) Foreign Application Priority Data

Oct. 22, 2001   (EP) .................................. 01811028

(51) Int. Cl.
*F16J 15/447*   (2006.01)
(52) U.S. Cl. ...................... 277/303; 277/355
(58) Field of Classification Search ................. 277/305, 277/355
See application file for complete search history.

(56) References Cited

U.S. PATENT DOCUMENTS

| | | | | |
|---|---|---|---|---|
| 3,574,473 A * | 4/1971 | Gaffal | ............................ | 415/1 |
| 3,600,101 A * | 8/1971 | Oglesby et al. | ............. | 415/111 |
| 3,697,088 A * | 10/1972 | Hummer | ...................... | 277/348 |
| 4,082,297 A | 4/1978 | Adams | | |
| 4,371,173 A * | 2/1983 | Kotzur | ........................ | 277/348 |
| 4,595,207 A * | 6/1986 | Popp | .......................... | 277/303 |
| 4,755,103 A * | 7/1988 | Streifinger | .................. | 415/111 |
| 4,819,950 A * | 4/1989 | Winslow | ..................... | 277/348 |
| 5,088,891 A * | 2/1992 | Brown et al. | ................. | 415/176 |
| 5,141,389 A * | 8/1992 | Bear et al. | ...................... | 415/30 |
| 5,156,534 A * | 10/1992 | Burgy et al. | ................ | 417/405 |
| 5,207,054 A * | 5/1993 | Rodgers et al. | ............... | 60/804 |
| 5,351,971 A * | 10/1994 | Short | .......................... | 277/355 |
| 5,997,004 A | 12/1999 | Braun et al. | | |
| 6,131,910 A * | 10/2000 | Bagepalli et al. | ............ | 277/355 |
| 6,139,019 A * | 10/2000 | Dinc et al. | .................. | 277/355 |
| 6,173,962 B1 | 1/2001 | Morrison et al. | | |
| 6,227,545 B1 * | 5/2001 | Kugler | ....................... | 277/306 |

(Continued)

FOREIGN PATENT DOCUMENTS

DE    2344666 A    3/1974

(Continued)

*Primary Examiner*—Alison K Pickard
(74) *Attorney, Agent, or Firm*—Townsend and Townsend and Crew, LLP

(57) ABSTRACT

A shaft sealing arrangement for a pump for delivering hot fluids includes a dynamic shaft seal (4), in particular a slide ring seal, in order to seal a rotatable shaft (2) relative to a housing (1), and a cooling ring (5) which is mounted in front of the dynamic shaft seal (4) in the direction of the pump interior and which surrounds the shaft (2) at a small spacing. The shaft sealing arrangement further includes an additional seal (8) which seals the shaft (2) in the region of the cooling ring (5) in order to reduce the feed of hot fluid into the gap between the shaft (2) and the cooling ring (5), with the additional seal (8) being formed as a brush seal.

16 Claims, 4 Drawing Sheets

U.S. PATENT DOCUMENTS

| | | | |
|---|---|---|---|
| 6,244,599 B1 * | 6/2001 | Braun et al. | 277/352 |
| 6,378,873 B1 * | 4/2002 | Mayer et al. | 277/355 |
| 6,416,057 B1 * | 7/2002 | Adams et al. | 277/355 |
| 6,976,679 B2 * | 12/2005 | Goss et al. | 277/347 |

FOREIGN PATENT DOCUMENTS

| | | |
|---|---|---|
| DE | 3136721 A1 | 3/1983 |
| DE | 19527781 C1 | 9/1996 |
| EP | 0836040 A1 | 4/1998 |
| EP | 1134424 A2 | 9/2001 |
| GB | 724510 A | 2/1955 |

\* cited by examiner

SHAFT SEALING ARRANGEMENT FOR A PUMP FOR DELIVERING HOT FLUIDS

This application is a divisional application of U.S. patent application Ser. No. 10/272,424, filed on Oct. 15, 2002, now abandoned which claims priority to European Patent Application No. 01811028.8, filed on Oct. 22, 2001.

BACKGROUND OF THE INVENTION

The invention relates to a shaft sealing arrangement for a pump for delivering hot fluids. The shaft sealing arrangement is arranged in a housing and includes a dynamic shaft seal, in particular a slide ring seal, to seal a rotatable shaft relative to the housing, and a cooling ring which is mounted in front of the dynamic shaft seal in the direction of the pump interior and which surrounds the shaft at a small spacing.

Centrifugal pumps are normally used to deliver hot fluids. Such a pump includes a pump shaft fitted with impellers which is rotatably arranged in a housing, and dynamic shaft seals in order to seal the shaft towards the housing. Pumps for delivering hot fluids further contain cooling zones or stretches which are mounted in front of the dynamic shaft seals in the direction of the pump interior in order to lower the temperature so far that standard shaft seals can be used. In larger pumps such as in boiler feed pumps, mostly water-cooled cooling rings are found as the cooling zones which surround the shaft at a small spacing. The gap between the shaft and the cooling ring is dimensioned such that normally no contact takes place between the shaft and the cooling ring. The gap is thus sufficiently wide that an exchange of fluid can take place between the gap and the adjoining pump interior. As long as the shaft rotates, the cooling action of the cooling ring is constant over the periphery of the shaft. However, if the shaft is stationary, a thermal flow is formed in the gap between the shaft and the cooling ring by hot fluid rising into the upper part of the gap and cooled fluid falling into the lower part. This effect, which is known as the thermosyphon circulation, results in a curving of the shaft as a consequence of the irregular temperature distribution. As a result of this, the strain of the bearing parts, such as of the relief piston for the compensation of the axial pressure, increases and additional contact points occur between rotating and non-rotating parts of the pump. The start-up of the pump is thereby made more difficult and an increased wear of the affected pump parts results. To avoid the above-described thermosyphon circulation during the standstill of the pump, intermediate insulation spaces are provided in the cooling ring and at the shaft periphery. For example, so-called thermo-sleeves are attached to the shaft periphery; these are shaft protection sleeves with an air gap between the shaft and the sleeve. The intermediate insulation spaces, however, are frequently not sufficient to prevent the thermosyphon circulation.

SUMMARY OF THE INVENTION

It is an underlying object of the invention to completely prevent the mentioned thermosyphon circulation in the gap between the shaft and the cooling ring, which occurs during the standstill of the pump, and to avoid the disadvantages associated therewith.

The shaft sealing arrangement in accordance with the invention, which is arranged in a housing, includes—in a first embodiment—a dynamic wave seal, in particular a slide ring seal, to seal a rotatable shaft relative to the housing, and a cooling ring which is mounted in front of the dynamic shaft seal in the direction of the pump interior and which surrounds the shaft at a small spacing, as well as an additional seal between the housing and the shaft and/or between the housing and a relief piston for the axial pressure and/or between the cooling ring and a shaft to reduce the supply of hot fluid into the gap between the shaft and the cooling ring, with the additional seal being formed as a brush seal which includes a plurality of closely arranged fibers, bristles and/or wires as sealing elements which are distributed in a ring-like manner and are secured and extend towards the surface to be sealed with their free ends.

In an advantageous manner, the fibers, bristles and/or wires of the brush seal are flexible or are secured flexibly and are arranged at an acute angle to the shaft surface, with the tip of the angle pointing in the running direction. The length of the fibers, bristles and/or wires is advantageously predetermined such that they are ground to a suitable length by the rotating shaft.

In a preferred variant, the brush seal is arranged close to the side boundary of the cooling ring, towards the pump interior. In a further preferred embodiment, the cooling ring is integrated in the housing. In a further preferred embodiment, the shaft is provided with a thermo-sleeve in the region of the cooling ring and/or in the region of the brush seal.

The invention is advantageously used with boiler feed pumps which are designed, for example, for fluid temperatures from 150 to 250° C. and for pressures of 60 to 360 bar.

In a variant, the shaft sealing arrangement for a pump for delivering hot fluids includes a dynamic shaft seal to seal a rotatable shaft relative to a housing and a cooling ring which is mounted in front of the dynamic shaft seal in the direction of the pump interior and which surrounds the shaft at a small spacing. The shaft sealing arrangement furthermore includes an additional seal which seals the shaft in the region of the cooling ring in order to reduce the supply of hot fluid into the gap between the shaft and the cooling ring, with the additional seal being formed as a brush seal.

In a second embodiment, the shaft sealing arrangement in accordance with the invention is arranged in a housing and includes a dynamic shaft seal in order to seal a rotatable shaft relative to the housing, with the dynamic shaft seal being designed as a brush sealing arrangement which includes a plurality of individual brush seals. The brush seals include a plurality of closely arranged fibers, bristles and/or wires as sealing elements which are distributed and secured in a ring-like manner and extend towards the surface to be sealed with their free ends.

The brush sealing arrangement advantageously includes a section in which a barrier liquid and/or a flushing liquid is fed. The barrier liquid and/or flushing liquid advantageously has a lower temperature than the delivered fluids to achieve a cooling action. Advantageously, a plurality of ring-like brush seals of the brush sealing arrangement are arranged next to one another as a packing.

The invention will be explained in more detail in the following with reference to the embodiments and to the drawing.

DESCRIPTION OF THE PREFERRED EMBODIMENTS

Figure 2:
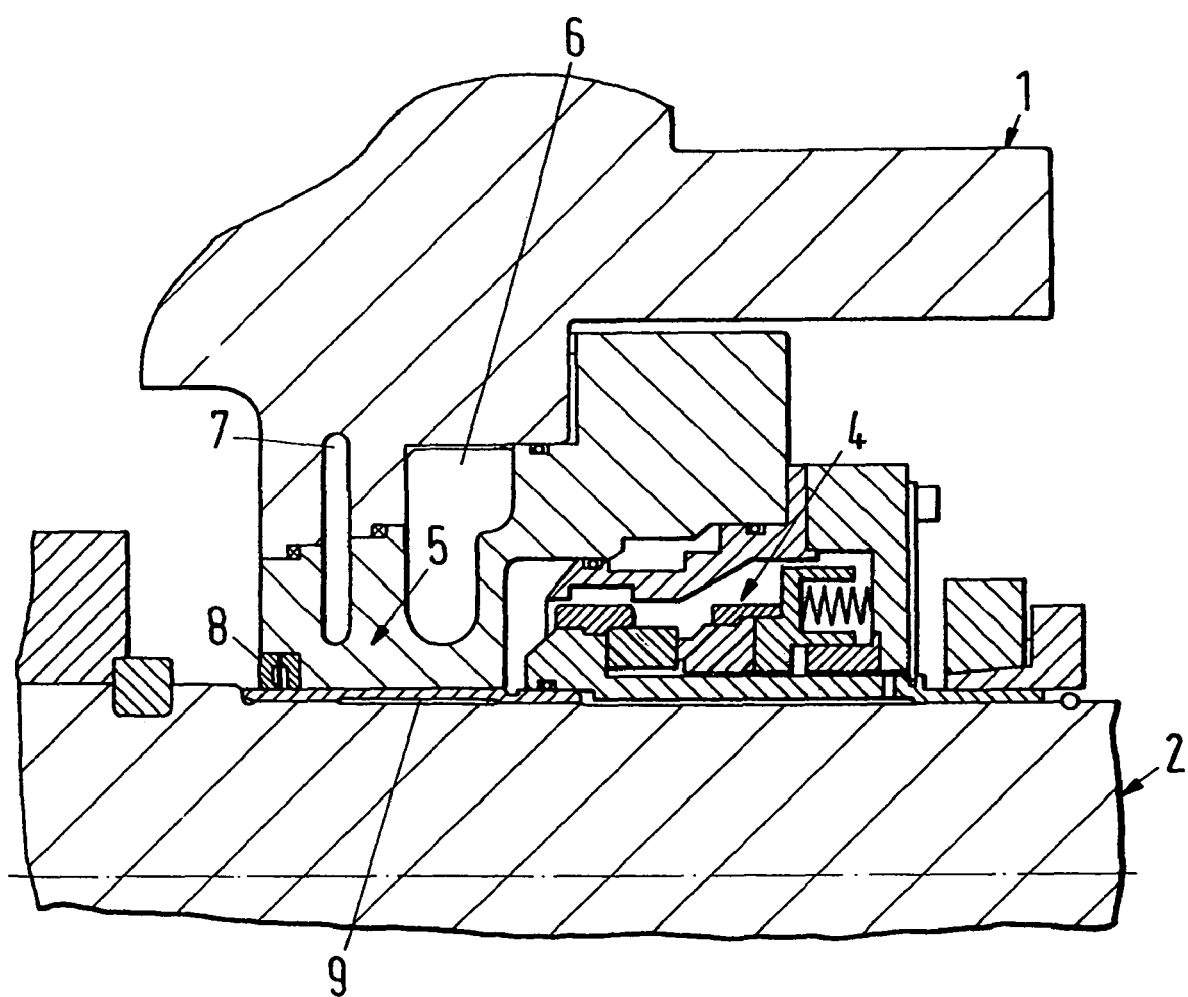
FIG. 2 is a longitudinal section through a shaft sealing arrangement in accordance with a first embodiment of the present invention.

FIG. 2 shows a longitudinal section through a shaft sealing arrangement in accordance with a first embodiment of the present invention. In FIG. 2, the reference numeral 1 designates a housing and the reference numeral 2 a shaft which is rotatably arranged in the housing 1. The bearings required for this are not shown in FIG. 2. The shaft sealing arrangement in accordance with the present embodiment includes a dynamic shaft seal 4 to seal the shaft 2 relative to the housing 1. The dynamic shaft seal 4 can, for example, be designed as a single-action or double-action slide ring seal, as a balanced slide ring seal, as a floating seal, as a brush sealing arrangement which includes a plurality of individual brush seals, or as a fixed restrictor or the like. In addition to the actual shaft seal, a quench seal can be used, that is, a sealing section through which a barrier liquid or a flushing liquid flows and which is sealed, for example, by simple radial sealing rings. The shaft sealing arrangement in accordance with the present embodiment furthermore includes a cooling ring 5 which is mounted in front of the dynamic shaft seal 4 in the direction of the pump interior, that is, towards the hot part of the pump, and which surrounds the shaft 2 at a small spacing in order to reduce the temperature so far, for example to approximately 60° C., that the dynamic shaft sealing 4 can be designed as a standard seal for medium temperatures. In the embodiment, the cooling ring 5 is integrated in the housing 1 and includes a ring-like, water-cooled chamber 6 and a ring-like air gap 7 for the thermal insulation of the cooling ring 5. The shaft sealing arrangement in accordance with the present embodiment furthermore includes an additional seal 8 which can be arranged at the hot side of the cooling ring 5, for example close to the side boundary of the cooling ring 5, towards the pump interior in order to reduce the feed of hot fluid into the gap between the shaft 2 and the cooling ring 5.

The seal 8 can also be arranged between the shaft 2 and a projecting part of the housing 1 which is mounted in front of the cooling ring or, if a relief piston for the axial pressure is present, between the relief piston and the housing 1. It is furthermore possible to provide a plurality of seals 8. In the shaft sealing arrangement in accordance with the invention, the additional seal 8 is formed as a brush seal which includes a plurality of closely arranged fibers, bristles and/or wires as sealing elements which are distributed and secured in a ring-like manner and extend with their free ends towards the surface of the shaft 2 to be sealed. The shaft 2 is expediently provided with a thermo-sleeve 9 in the region of the additional seal 8 and/or in the region of the cooling ring 5. An air gap can be provided between the thermo-sleeve 9 and the shaft 2 for the thermal insulation.

Figure 1:
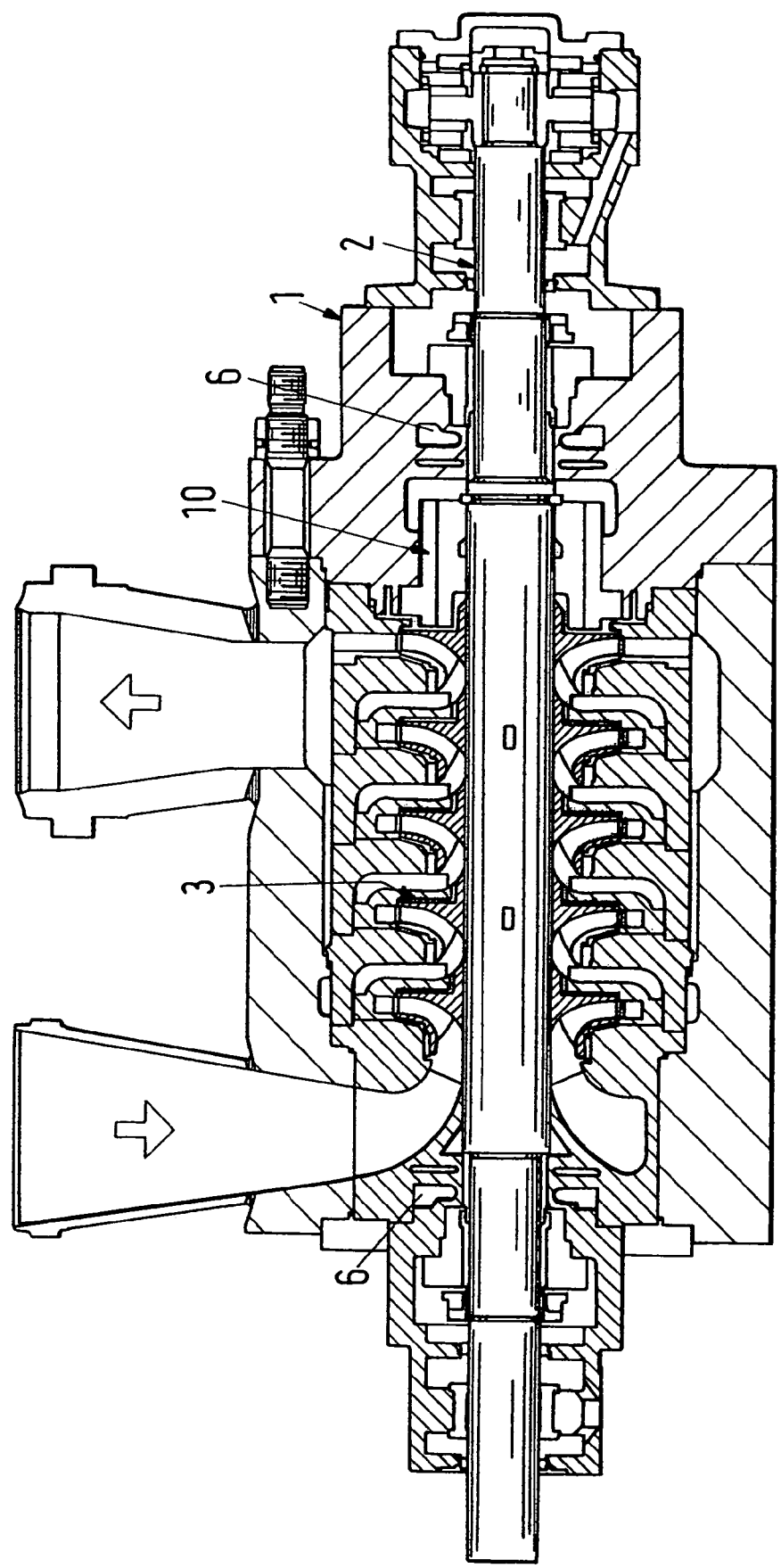
FIG. 1 is a longitudinal section through a boiler feed pump.
Figure 3:
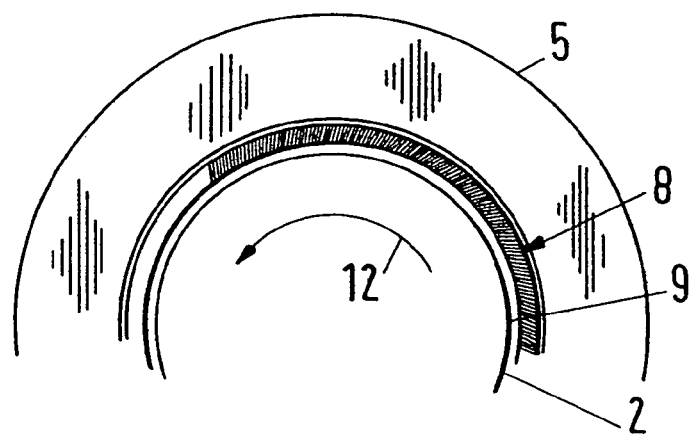
FIG. 3 is a cross-section through a shaft sealing arrangement in accordance with the first embodiment, with the sectional plane having been laid in the brush seal.

FIG. 3 shows a cross-section through a shaft sealing arrangement in accordance with the embodiment, with the sectional plane having been placed in the brush seal. As can be seen from FIG. 3, a thermo-sleeve 9 is arranged on a shaft 2. An additional seal 8, which is mounted in a cooling ring 5, surrounds the thermo-sleeve 9 such that the shaft 2 is sealed towards the cooling ring 5. In the shaft sealing arrangement in accordance with the invention, the additional seal 8 is formed as a brush seal which includes a plurality of closely arranged fibers, bristles and/or wires, which are distributed and secured in ring-like manner and which extend with their free ends towards the surface to be sealed, that is, in the present embodiment, towards the surface of the thermo-sleeve 9. The section in FIG. 3 has been laid such that the fibers, bristles and/or wires of the seal 8 are visible. The fibers, bristles and/or wires of the brush seal are advantageously flexible and/or flexibly secured and arranged at an acute angle to the shaft surface, with the tip of the angle extending in the running direction 12 of the shaft 2. The length of the fibers, bristles and/or wires is advantageously predetermined such that they are ground to a suitable length by the rotating thermo-sleeve 9 and/or the shaft 2 and/or a relief piston 10 drawn in FIG. 1.

Trials with pumps for delivering hot fluids such as boiler feed pumps have shown that the thermosyphon circulation, which otherwise occurs in the gap between the shaft and the cooling ring during the standstill of the hot pump, can be practically fully suppressed with the aid of the shaft sealing arrangement described above. The disadvantages associated with the thermosyphon circulation such as curving of the shaft at standstill, start-up problems and increased wear at the contact points between rotating and non-rotating parts of the pump are thus also avoided. The use of the shaft sealing arrangement in accordance with the invention is a simple and cost-favorable measure to prevent the thermosyphon circulation.

Figure 4:
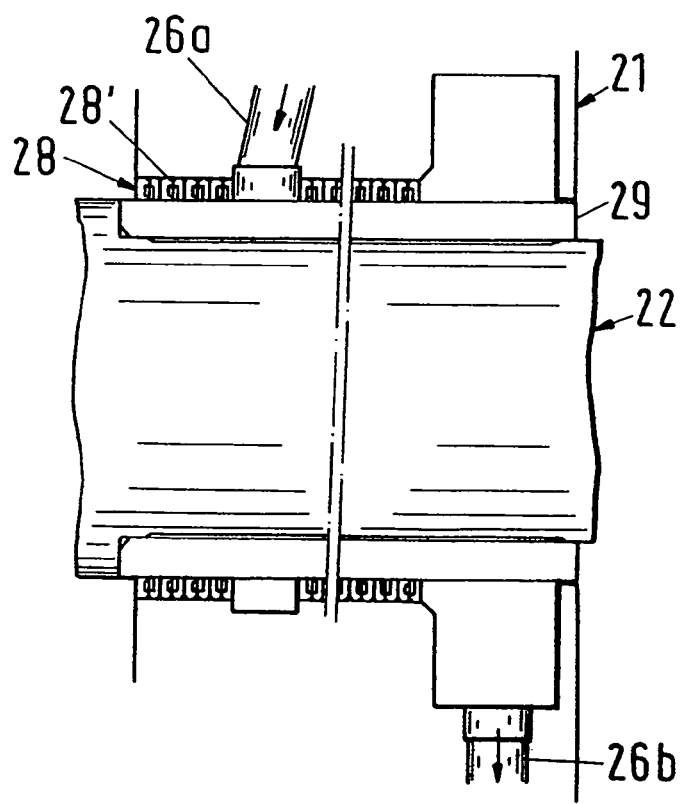
FIG. 4 is a longitudinal section through a shaft sealing arrangement in accordance with a second embodiment of the present invention.
Figure 4A:
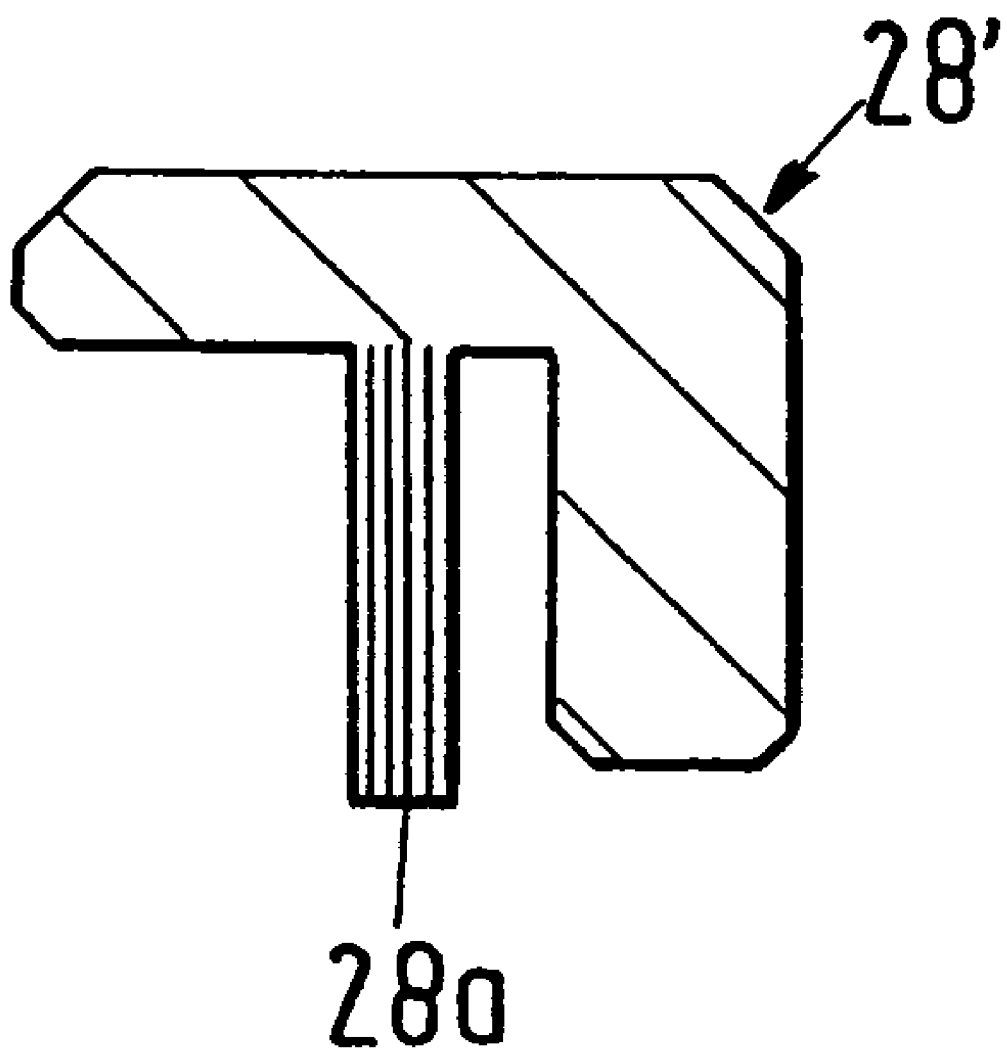
FIG. 4a is a cross-section through a brush seal (detailed view).

FIG. 4 shows a longitudinal section through a shaft sealing arrangement in accordance with a second embodiment of the present invention. In FIG. 4, the reference numeral 21 designates a housing and the reference numeral 22 a shaft which is rotatably arranged in the housing 21. The bearings required for this are not shown in FIG. 4. The shaft sealing arrangement in accordance with the present embodiment includes a dynamic shaft seal to seal the shaft relative to the housing 21, with the dynamic shaft seal being designed as a brush seal arrangement 28 which includes a plurality of individual brush seals 28'. A detailed view of a cross-section through an individual brush seal 28' is shown in FIG. 4a. The brush seals 28' include a plurality of closely arranged fibers, bristles and/or wires 28a as sealing elements which are distributed and secured in ring-like manner and extend with their free ends towards the surface to be sealed. In addition to the individual brush seals, the brush seal arrangement 28 can include a quench seal, that is, a seal section through which a barrier liquid or a flushing liquid flows. For this purpose, the brush sealing arrangement 28 in the present embodiment includes a feed line 26a and a discharge line 26b for the barrier liquid and/or flushing liquid. The barrier liquid and/or flushing liquid advantageously has a lower temperature than the delivered fluids in order to achieve the cooling action. A plurality of ring-like brush seals 28' of the brush sealing arrangement 28 are advantageously arranged next to one another as a packing. The shaft 22 is expediently provided with a thermo-sleeve 29 in the region of the brush sealing arrangement 28. An insulation gap can be provided between the thermo-sleeve 29 and the shaft 22 for the thermal insulation.

In a preferred variant, the shaft sealing arrangement in accordance with the second embodiment, and in particular the dynamic shaft seal, that is, the brush sealing arrangement 28 or parts thereof, acts as a cooling zone. Brush seals are exceptionally suitable for the dissipation of heat both from the shaft to be sealed and from fluids inside the seal, if the fibers, bristles and/or wires of the brush seal consist of material such as metal with good thermal conductive properties. The fibers, bristles and/or wires in this case form a large metallic surface which is opposite a small fluid volume inside the seal. A thermosyphon circulation is practically suppressed under these circumstances and the problems associated with the thermosyphon circulation are avoided.

The invention claimed is:

1. A method for preventing a non-uniform heating of a pump shaft rotatably mounted in a pump housing for pumping a relatively hot fluid, the pump shaft extending into the housing and the housing forming a cooling ring surrounding the shaft and between the shaft and the cooling ring an annular gap in fluid communication with the hot fluid in the housing, the method comprising limiting circulation of hot fluid into the annular gap when the shaft is stationary by placing a brush seal between the shaft and the hot fluid in the housing which limits hot fluid from entering the annular gap when the shaft is stationary and thereby prevents an upper portion of the shaft from becoming significantly hotter than a lower portion of the shaft due to a concentration of relatively hotter fluid at an upper portion of the annular gap relative to a lower portion of the annular gap.

2. A method according to claim 1 including placing a main seal between the shaft and the housing and outside the gap.

3. A method according to claim 1 including placing a main seal in the gap between the shaft and the housing, and sealing the gap with the main seal to the exterior.

4. A method according to claim 3 wherein the brush seal is located between the main seal and the hot fluid, and including cooling a space between the main seal and the brush seal to prevent an overheating of the main seal.

5. A method according to claim 1 wherein the housing includes a cooling ring facing the hot fluid in the housing, and wherein the annular gap between the housing and the shaft is formed by the cooling ring and the shaft.

6. A method according to claim 1 including flowing at least one of a barrier liquid and a flushing liquid past the brush seal into the gap.

7. A method according to claim 6 including giving the at least one of the barrier liquid and the flushing liquid a lower temperature than the hot fluid.

8. A method according to claim 1 including arranging a plurality of adjacent brush seals on the shaft next to each other.

9. A method according to claim 8 including flowing a cooling liquid about the shaft between axial ends of the brush seals on the shaft.

10. A method according to claim 1 wherein the brush seal comprises a multiplicity of at least one of fibers, bristles and wires which radially extend between the shaft and housing and across the gap, and including shortening the at least one of fibers, bristles and wires so they extend substantially fully across the gap.

11. A method according to claim 1 wherein the brush seal includes at least one of fibers, bristles and wires, and including arranging the at least one of fibers, bristles and wires so they are arranged at an acute angle relative to a surface of the shaft so that ends thereof trail in the direction of rotation of the shafts.

12. A method according to claim 1 wherein the brush seal includes a quench seal.

13. A method according to claim 1 wherein circulation comprises thermal siphoning.

14. A method for preventing thermal siphoning in a shaft sealing arrangement between a rotatably mounted shaft and a housing into which the shaft extends, the housing forming an interior space holding a relatively hot fluid, a cooling ring surrounding the shaft and facing the hot fluid in the interior space, and an annular gap between the shaft and the cooling ring, the method comprising rotating the shaft during a first operational phase, stopping rotation of the shaft during a second operational phase, and limiting the formation of a temperature gradient between upper and lower cross-sectional portions of the shaft during the second operational phase by placing a brush seal between the relief piston and the housing which limits entry of the hot fluid from the interior space into the annular gap.

15. A method according to claim 14 including positioning the relief piston between the cooling ring and the interior space.

16. A method for preventing thermal siphoning in a shaft sealing arrangement between a rotatably mounted shaft and a housing into which the shaft extends, the housing forming an interior space holding a relatively hot fluid, a cooling ring surrounding the shaft and facing the hot fluid in the interior space, a relief piston for axial pressure, and an annular gap between the shaft and the cooling ring, the method comprising rotating the shaft during a first operational phase, stopping rotation of the shaft during a second operational phase, and limiting the formation of a temperature gradient between upper and lower cross-sectional portions of the shaft during the second operational phase by placing a brush seal between relief piston and housing which limits entry of the hot fluid from the interior space into the annular gap.

* * * * *